United States Patent
Brennan et al.

(10) Patent No.: US 6,869,139 B2
(45) Date of Patent: Mar. 22, 2005

(54) AUTOMOTIVE VEHICLE SEATING COMFORT SYSTEM

(75) Inventors: Lindy Brennan, Kingsville (CA); Goran Bajic, Windsor (CA); Lucas Fernandez, Windsor (CA); Valerija Drobnjakovic, Windsor (CA)

(73) Assignee: W.E.T. Automotive Systems AG, Odelzhausen (DE)

( * ) Notice: Subject to any disclaimer, the term of this patent is extended or adjusted under 35 U.S.C. 154(b) by 0 days.

(21) Appl. No.: 10/681,555

(22) Filed: Oct. 8, 2003

(65) Prior Publication Data

US 2004/0070236 A1 Apr. 15, 2004

Related U.S. Application Data

(63) Continuation of application No. 10/463,052, filed on Jun. 17, 2003.
(60) Provisional application No. 60/428,003, filed on Nov. 21, 2002, and provisional application No. 60/407,198, filed on Aug. 29, 2002.

(51) Int. Cl.⁷ ............................................. A47C 31/00
(52) U.S. Cl. ............................... 297/18.01; 297/180.11; 297/180.12; 297/180.13; 297/180.14
(58) Field of Search ....................... 297/180.1, 180.11, 297/180.12, 180.13, 180.14

(56) References Cited

U.S. PATENT DOCUMENTS

| | | | | |
|---|---|---|---|---|
| 5,902,014 A | * | 5/1999 | Dinkel et al. | 297/452.43 |
| 5,924,766 A | * | 7/1999 | Esaki et al. | 297/180.13 |
| 5,934,748 A | * | 8/1999 | Faust et al. | 297/180.12 |
| 6,003,950 A | * | 12/1999 | Larsson | 297/452.42 |
| 6,064,037 A | * | 5/2000 | Weiss et al. | 219/217 |
| 6,179,706 B1 | * | 1/2001 | Yoshinori et al. | 454/120 |
| 6,186,592 B1 | * | 2/2001 | Orizaris et al. | 297/180.12 |
| 6,189,966 B1 | * | 2/2001 | Faust et al. | 297/180.14 |
| 6,541,737 B1 | * | 4/2003 | Eksin et al. | 219/217 |
| 2002/0067058 A1 | * | 6/2002 | Pfahler | 297/180.11 |
| 2002/0096915 A1 | * | 7/2002 | Haupt et al. | 297/180.13 |
| 2002/0096931 A1 | * | 7/2002 | White | 297/452.42 |
| 2002/0150478 A1 | * | 10/2002 | Shinji | 417/44.1 |
| 2004/0036326 A1 | * | 2/2004 | Bajic et al. | 297/180.14 |

FOREIGN PATENT DOCUMENTS

DE            3513909 A1 * 10/1986    ............ B60N/1/00

* cited by examiner

Primary Examiner—Peter M. Cuomo
Assistant Examiner—Sarah C. Burnham
(74) Attorney, Agent, or Firm—Dobrusin & Thennisch, P.C.

(57) ABSTRACT

There is disclosed an automotive vehicle seating comfort system for providing heating, cooling, ventilation or a combination thereof to an individual in an automotive car seat. The system typically includes an insert, a blower and a tubular structure for providing fluid communication between the insert and blower for providing ventilation and/or cooling for the individual. Preferably, the insert includes a heater or heater layer for providing heat for the individual.

38 Claims, 2 Drawing Sheets

AUTOMOTIVE VEHICLE SEATING COMFORT SYSTEM

CLAIM OF PRIORITY

The present invention is a continuation of U.S. application Ser. No. 10/463,052 filed Jun. 17, 2003, the content of which is incorporated by reference herein for all purposes. The present invention also claims the benefit of the priority of U.S. Provisional Applications Ser. No. 60/407,198 filed Aug. 29, 2002 and Ser. No. 60/428,003 filed Nov. 21, 2002, the contents of which are incorporated by reference herein for all purposes.

FIELD OF THE INVENTION

The present invention relates generally to automotive vehicle seats, and more particularly to seating comfort system for providing heating, cooling, ventilation or a combination thereof to an occupant of a seat of an automotive vehicle.

BACKGROUND OF THE INVENTION

For many years the transportation industry has been concerned with designing seats for automotive vehicles that provide added comfort to occupants in the seats. Various innovations in providing seating comfort are discussed in U.S. Pat. Nos. 6,064,037; 5,921,314; 5,403,065; 6,048,024 and 6,003,950, all of which are expressly incorporated herein by reference for all purposes. In the interest of continuing such innovation, the present invention provides an improved seating system, insert for a seat or both, which are preferably suitable for employment within or as part of an automotive vehicle seat and which assist in providing comfort control to an occupant in the seat.

There is believed to be a need for an improved system for seating comfort pursuant to which an insert (which is not encapsulated or otherwise sealed along its edges) is provided for performing the seating comfort functions. There is also believed to be a need for a system in which a blower is employed for applying positive pressure to blow air with a comfort system.

SUMMARY OF THE INVENTION

Accordingly, the present invention provides a ventilated seat having a seating comfort system. The vehicle seat includes a seat cushion component and a seat backrest component, at least one of which provides a seat cushion and an air-permeable trim surface at the occupant contact areas of the seat. The system includes an insert located beneath the trim surface of each ventilated component. The insert includes a first layer having a heater integrated therein and a second layer formed of spacer material wherein the second layer defines an open space. The system also includes a positive pressure blower in fluid communication with the insert for moving air through the open space and at least partially past an occupant in the seat. A tubular structure is preferably provided in the system for providing the fluid communication between the insert and the fluid mover.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The present invention is predicated upon providing a seating system for an automotive vehicle wherein the system is configured to provide heating, cooling, ventilation or a combination thereof to an occupant in a seat. The system will typically include an insert having a heater and a fluid or air blower (preferably one in which fluids are displaced by blowing under a positive pressure). The system may also include a structure for facilitating fluid communication between the insert and the blower. The insert will typically include at least one layer, but more typically includes multiple (e.g., two or three or more) layers. One of the layers incorporates a heater and is therefore referred to herein as a heater layer. Preferably, one or more of the layers is a spacer layer for providing open space for fluid flow within and through the insert.

Figure 1:
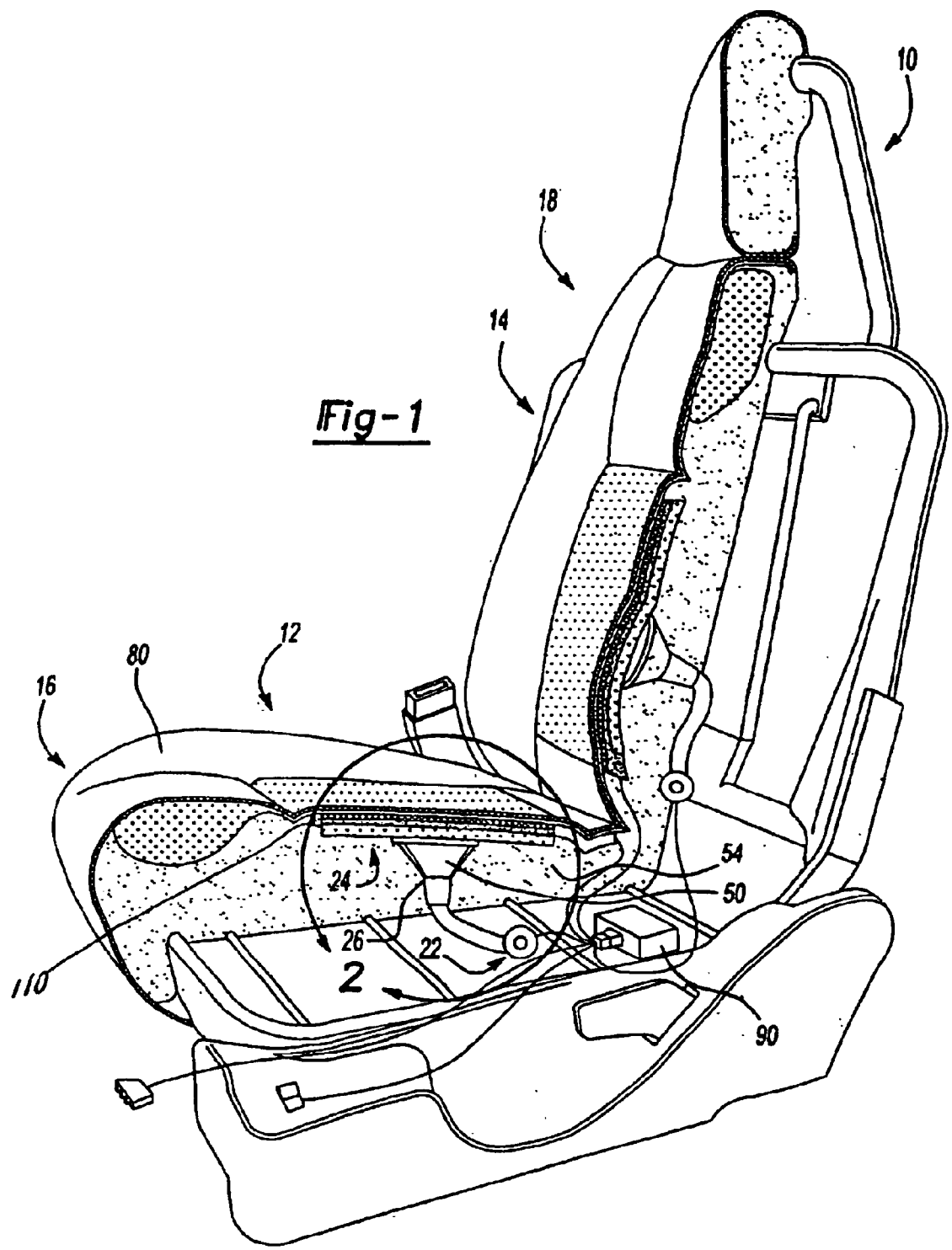
FIG. 1 is a cut-away perspective view of a vehicle seat having a comfort system in accordance with an exemplary aspect of the present invention.
Figure 2:
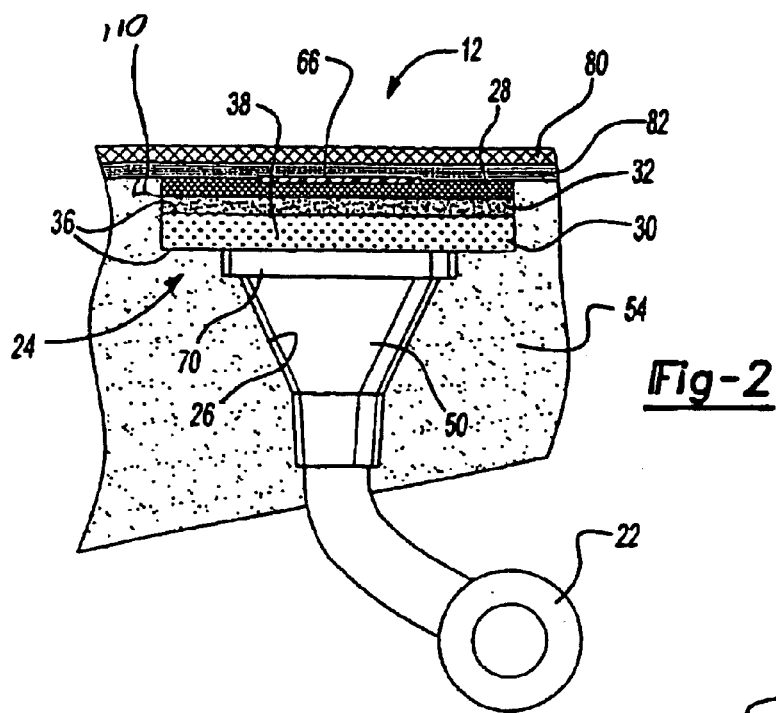
FIG. 2 is a sectional view of a portion 2—2 of the vehicle seat of FIG. 1.

Referring to FIGS. 1 and 2, there is illustrated a vehicle seat 10 having a pair of exemplary seating comfort systems 12, 14 according to a preferred aspect of the present invention. As shown, one system 12 may be located in a seat cushion component 16 of the seat 10 while the other system 14 may be located in a seat backrest component 18 of the seat 10. Either of the systems may be omitted as well. The systems 12, 14 are substantially identical to each other, and therefore, the discussion shall focus on the system 12 in the seat cushion component 16 of the seat 10. It shall be understood, however, that multiple systems may be employed in one seat and the systems may be associated with or incorporated into the seat cushion component 16, the seat backrest component 18, other portions of the seat 10 or a combination thereof.

The system 12 includes a fluid mover shown as a blower 22 in fluid communication with an insert 24 via a duct (e.g., a tubular structure) 26. By "tubular" as used herein, the shape of the tube may vary and can be rounded, have edges, corners or the like. The insert 24 typically includes multiple layers laminated together and preferably includes a heater for providing warmth to a seat occupant and an open space for ventilation fluid flow. In the preferred embodiment, the insert 24 includes a heater layer 28 and a spacer layer 30, which are laminated and adhered together with an adhesive or adhesive layer 32. A preferred construction is one in which the insert is open at its sides and is not encapsulated.

Various different types of heaters are suitable for incorporation into a car seat and it is contemplated that any of such heaters may be incorporated into the insert 24 of the present invention. Such heaters typically incorporate flexible electrical substantially flat heating elements. As examples, a lay-wire heater, a carbon fiber heater or the like, which are typically supported with a backing (e.g., a cloth or fabric type backing) may be used within the insert. In a preferred embodiment, the heater layer 28 is a carbon fiber type heater with a backing (e.g., a non-woven layer). Preferably, the heater layer, the backing or both are breathable for allowing air to pass therethrough. One exemplary preferred heater is sold under the tradename CARBOTEX® and is commercially available from W.E.T. Automotive Systems, Inc. in Germany and/or FTG Fraser-Technik GmbH, Schleizer Strasse 56–58, D-95028 Hot/Saale, Germany. An example of such a heater is disclosed in U.S. Pat. No. 6,064,037, issued May 16, 2000, herein expressly incorporated by reference for all puposes.

It is contemplated that a buffer layer may be incorporated into the insert 24 adjacent the heater layer 28. Preferably, the buffer layer is a layer of gauze which is capable of protecting the heater layer 24 although various alternative protective materials may be used such as cloth, fleece or the like. Just like the other layers, it is preferable that the buffer layer is breathable or permeable for allowing fluid flow therethrough.

The adhesive of the insert 24 may be supplied in layers, drops or in a variety of other configurations. In the preferred embodiment depicted, the adhesive layer 32 of the insert 24 is disposed between the heater layer 28 and the spacer layer 30 for adhering the layers 28, 30 together. The adhesive layer 32 is preferably formed of a hot melt adhesive, although it is not necessarily required, and may be other adhesives as well. The adhesive may be provided as a web or otherwise and may be continuous or non continuous (e.g., may be applied in drops, dabs or the like). The adhesive layer 32 may include an adhesive selected from polyamides, polyesters, elastomers, vinyl acetates, acrylics, urethanes, olefin polymers or a combination thereof. Moreover, the adhesive may be formulated as desired for particular processing parameters or conditions. Preferably, the adhesive layer is substantially free of anti-blocking solutions, blowing additives, process contaminants or the like which might interfere with adhesive performance. As an example, one suitable hot melt adhesive is commercially available as a non-woven web under the tradename SPUNFAB® from Spunfab, Ltd. 175 Muffin Lane, Cuyahoga Falls, Ohio 44223.

The spacer layer 30 is preferably formed of a spacer material. The spacer material may be provided as a variety of synthetic materials such as plastic or polymeric materials, padding and stuffing materials, lining and carrier materials or the like. Preferably, the spacer material provides open space within the layer 30 while remaining at least partially pliable or flexible. As one example, the spacer layer may be provided as a plurality of rubber, foam plastic or other members or fibers. The members or fibers are preferably spaced apart from each other to provide open space therebetween while still being close enough together to provide cushion and support. As another example the spacer layer 30 may be formed of a 3-dimensional spacer fabric structure or material.

In the preferred embodiment depicted, the spacer layer 30 is formed of polymeric (e.g., polyester) strand material that is interwoven to provide opposing honeycomb structures 36 (e.g., fabric panels), which are interconnected by several additional polymeric strand materials to provide open space 38 between the structures 36 while still providing cushion and support. As an example, one preferred material is sold under the tradename 3MESH® and is commercially available from Müller Textil GmbH, Germany or Müller Textiles, Inc., Rhode Island, USA. In a particularly preferred embodiment, one or more of the honeycomb structures 36 include a finer filament polymeric strand material than the rest of spacer layer 30 for assisting adhesion of the spacer layer 30 to other materials.

Figure 4:
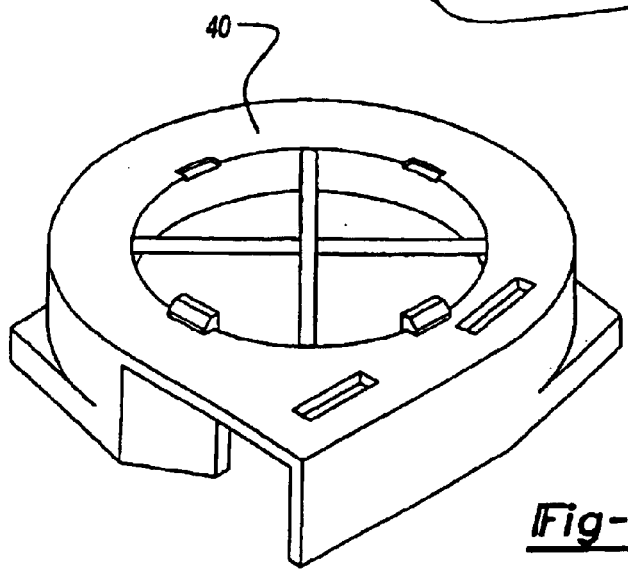
FIG. 4 is a perspective view of an exemplary blower housing suitable for application in the system of the present invention.

The blower 22 of FIGS. 1 and 2, a housing 40 of which is shown in FIG. 4 (e.g., adapted for snap fit connection to a mounting surface), may be positioned in a variety of locations within or outside the seat 10. Moreover, it is contemplated that the blower 22 may be secured to the seat 10 or to other vehicle components with a variety of attachments (e.g., fasteners, sewing, mating threaded attachments, quick connects, snap fits or the like). Further, it is contemplated that the blower 22 may include fingerguards, deflectors or the like.

The tubular structure 26 may be supplied in a variety of configurations and may be integrated with or separate from a variety of components (e.g., the seat, the insert, the blower or the like) and preferably provides for fluid communication between the insert 24 and the blower 22. As an example, it is contemplated that the tubular structure 26 may be integrated into portions of the seat 10 such as the foam cushions. As an alternative example, the tubular structure may be supplied as a separate component (e.g., a separate preferably flexible tube). As still another alternative example, the tubular structure may be integral with the insert 24, the blower 22, the seat 10 or a combination thereof. It is also contemplated that the tubular structure may be provided as a combination of any of the above examples.

In FIGS. 1 and 2, the tubular structure 26 is provided by a foam cushion 34 of the seat 10 and the structure 26 defines a passageway 50 (e.g., through-hole) extending through the foam cushion 54 for interconnecting the insert 24 and the blower 22 and providing fluid communication therebetween. As shown, particularly in FIG. 1, such a tubular structure 26, (e.g., including an enlarged passageway 50) may extend through the foam cushion in either the seat cushion component 16 or the seat backrest component 18 of the seat 10. In the embodiment depicted, fluid communication between the tubular structure 26 and the blower 22 and fluid communication between the tubular structure 26 and the insert 24 are substantially direct, however, such is not necessarily required. In a highly preferred embodiment, a portion of a wall of the tubular structure 26 nearest the forward edge of the seat cushion component 16 is at an angle between about 20 degrees and about 60 degrees (e.g., about 45 degrees) relative to another portion of the wall of the tubular structure 26 that is nearest a rearward edge of the seat cushion component 16.

Preferably, the tubular structure 26 provides a substantially fluid-tight (e.g., air tight) connection with the insert 24. To aid in this, the enlarged portion 50 may be formed, in dense form or as a foam. The walls of the tubular structure 26 are preferably coated or lined with a densified layer, such as by providing the tubular structure 26 (e.g., foam walls) with a coating such as a silicon coating, or by providing the tubular structure 26 with a lining (e.g., a polymer lining, a tape lining or the like).

Figure 3:
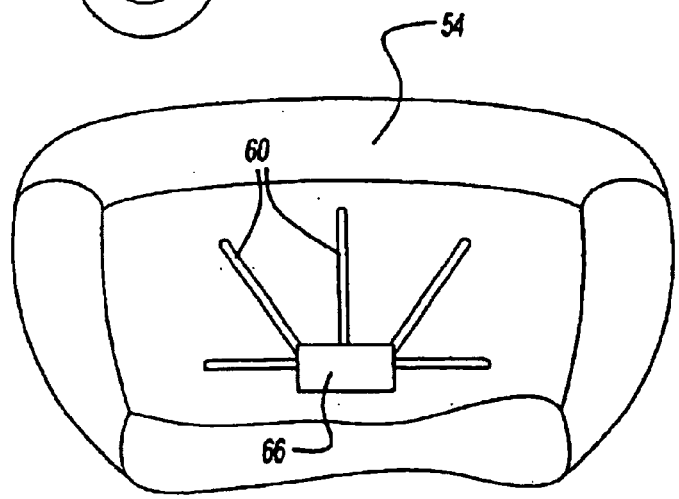
FIG. 3 is a perspective view of a seat cushion suitable for use in a comfort system in accordance with an exemplary aspect of the present invention.

As an additional option, the system 10 of the present invention may include one or more additional sub-passageways or openings for assisting in guiding fluid flow between the blower 22 and the insert 24. The sub-passageways may be defined by structures separate from the seat 10 or the insert 24 or may be integral therewith. In FIG. 3, a plurality of sub-passageways 60 are supplied as channels that are formed in the foam cushion 54. Preferably, the sub-passageway 60 extends radially away from the passageway 50 through the cushion 54. Also, as shown in FIG. 3, it is contemplated that a deflector 66 (e.g., a strip of tape) may be placed over the passageway 50 of the cushion 54 for assisting in directing fluid radially away from the passageway 50 and particularly through the sub-passageways 60.

The insert 24 is preferably assembled to the seat 10 by placing the insert 24 in overlaying relation with the cushion 54 such that the insert 24 covers the passageway 50, the sub-passageways 60 or both. In the depicted embodiment, a support 70 (e.g., a plastic panel with through-holes extending therethrough) is placed over the passageway 50 for providing continuity of support along with the cushion 54. The insert 24 is then placed within one or more cavities 74 in the cushion 54.

The insert 24 may be positioned upon the cushion 54 in a pre-assembled condition or the components or layers (e.g., the spacer layer, the adhesive layer, the heater layer or combinations thereof) may be applied separately. In a preferred embodiment, the spacer layer 30 is laminated to the heater layer 28 with the adhesive layer 32 therebetween to adhere the spacer layer 30 to the heater layer 28. It is contemplated that lamination may be effected by feeding the various layers 28, 30, 32 to a laminator (e.g., a belt and roller laminator, a stationary laminator or the like) or otherwise. If desired, the insert 24 may be adhered, fastened or otherwise attached to the cushion 54 of the seat 10.

One or more trim layers 80, 82 are assembled to the seat 10 to cover the cushion 54, the insert 24 or both. Preferably, the trim layers 80, 82 are fluid (e.g., air) permeable or breathable. In the preferred embodiment, the system 12 includes an outer trim layer 80 of permeable (e.g., perforated) leather or cloth and an inner trim layer 82 that is formed of a breathable padding material. As shown, the heater layer 28 is preferably closer to the trim layers 80, 82 than the spacer layer 30 although not required.

Operation

In operation, the system 10 of the present invention can preferably provide heating, cooling, ventilation or a combination thereof to an occupant of a seat having the system 10. In particular, if heat is desired, electric current can be induced to travel through the heater layer 28 by a control unit 90 or otherwise such that the heater layer 28 can provide heat to the occupant.

Alternatively, if cooling or ventilation is desired, the blower 22 can be operated via the control unit 90 or otherwise to blow air through the passageway 50, the sub-passageways 60 or both and through the open space 38 of the spacer layer 30 of the insert 24. Such air preferably flows at least partially past the occupant of the seat before or after flowing through the trim layers 80, 82 thereby providing ventilation to the occupant and providing convective heat transfer away from the occupant via the flowing air.

Although, it may be preferable for only the heater layer 28 or the ventilation system (i.e., the blower 22) to be running at one time, it is contemplated that both may be operated simultaneously. Moreover, it is contemplated that both the heater layer 28 and the ventilation system may be operated at various levels (e.g., 2, 3 or more levels of output) such as by having a blower that can operate at different levels or by having various levels of electricity flowing through the heater layer 28. It is also contemplated that the blower 22 may pull air into the open space 38, the passageway 50, the sub-passageways 60 or a combination thereof as well as pushing air into the open space 38, the passageway 50, the sub-passageways 60 or a combination thereof.

It is also contemplated that one or more temperature sensors (e.g., a thermostat) may be included in the seating comfort system. Typically, any temperature sensors are near the trim layers 80, 82 for sensing a temperature closely related to (e.g., at or near) a temperature being experienced by an individual in the seat. In a preferred embodiment, one or more temperature sensors are positioned upon the heater layer 28 or upon the heater element of the heater layer. Also in the preferred embodiment, the one or more temperature sensors are in signaling communication with the control unit 90 such that the control unit 90 can control the blower 22, the heater layer 28 or both for attaining or maintaining a desired temperature at areas adjacent the individual and/or the temperature sensor.

In the preferred embodiment shown, the comfort control system 10 includes a temperature sensor 110 just below the trim layers 80, 82 and in signaling communication with the control unit 90. Advantageously, the control unit 90 is programmed to instruct the system 10 to provide less heat and even cooling in situations where the sensor 110 senses a temperature above one or more predetermined threshold levels. In operation, the control unit 90 may be programmed to instruct the system to provide less cooling or even heating when the sensor 110 senses a temperature below one or more predetermined threshold levels. In a preferred operation mode, when the blower 22 is providing ventilation, the control unit 90 is programmed to instruct the heater layer 28 to turn on and provide heat while the blower 22 remains on if a first undesirably low predetermined temperature is sensed by the sensor 110. Then, if a second predetermined temperature is sensed below the first predetermined temperature, the control unit 90 instructs the blower 22 to turn off while the heater layer 28 continues to provide heat. For each of these situations, the heater layer 28 will typically be instructed by the control unit 90 to continue to provide heat until the temperature sensed by the sensor 110 is at or above the first predetermined temperature and may provide heat until a third predetermined temperature above the first predetermined temperature is sensed.

In another preferred operation mode, when the heater layer 28 is providing heat, the control unit 90 is programmed to instruct the blower 22 to turn on and blow air while the heater layer 28 remains on if a first undesirably high predetermined temperature is sensed by the sensor 110. Then, if a second predetermined temperature is sensed above the first predetermined temperature, the control unit 90 is programmed to instruct the heater layer 28 to turn off while the blower 22 continues to blow air. For each of these situations, the blower 22 will typically be instructed by the control unit 90 to continue to blow air until the temperature sensed by the sensor 110 is at or below the first predetermined temperature and may blow air until a third predetermined temperature below the first predetermined temperature is sensed.

The preferred embodiment of the present invention has been disclosed. A person of ordinary skill in the art would realize however, that certain modifications would come within the teachings of this invention. Therefore, the following claims should be studied to determine the true scope and content of the invention

What is claimed is:

1. A ventilated seat for a vehicle, comprising:
   a vehicle seat having a ventilated component selected from a seat cushion component and a seat backrest component, at least one of which provides a seat cushion and an air permeable trim surface at occupant contact areas of the seat;
   an insert that is open at its sides and located beneath the trim surface of the ventilated component, the insert including:
   i) a first layer having a heater integrated therein;
   ii) a second layer formed of spacer material, the second layer defining an open space, wherein the spacer material provides opposing honeycomb structures that are formed of a finer filament polymeric strand material than the rest of the spacer material;
a fluid mover in fluid communication with the insert for moving air through the open space and at least partially past an occupant in the seat; and
a tubular structure for providing the fluid communication between the insert and the fluid mover.

2. The ventilated seat of claim 1 wherein the insert further comprises an adhesive layer for adhering the first layer to the second layer.

3. The ventilated seat of claim 1 wherein the tubular structure is integral with the insert.

4. The ventilated seat of claim 1 wherein the tubular structure is defined by a wall and a portion of the wall nearest a forward edge of the seat cushion component is at an angle between about 20 degrees and about 60 degrees relative to another portion of the wall nearest a rearward edge of the seat cushion component.

5. The ventilated seat of claim 1 further comprising a control unit for selectively operating the fluid mover, the heater layer or both.

6. The ventilated seat of claim 5 wherein the control unit is configured to operate the heater layer, the fluid mover or both at two or more different output levels.

7. The ventilated seat of claim 5 wherein the control unit is in signaling communication with a temperature sensor and the control unit is configured to activate the fluid mover if a relatively high temperature is sensed by the sensor and activate the heater if a relatively low temperature is sensed by the sensor.

8. The ventilated seat of claim 1 wherein the fluid mover is configured to pull air through the open space provided by the spacer layer.

9. The ventilated seat of claim 1 wherein the fluid mover is configured to push air through the open space of the spacer material.

10. A ventilated seat for a vehicle, comprising:
a vehicle seat having a ventilated component selected from a seat cushion component and a seat backrest component, at least one of which provides a seat cushion and an air permeable trim surface at occupant contact areas of the seat;
an insert that is open at its sides and located beneath the trim surface of the ventilated component, the insert including:
  i) a first layer having a heater integrated therein;
  ii) a second layer formed of spacer material, the second layer defining an open space, wherein the spacer material provides opposing honeycomb structures that are formed of a finer filament polymeric strand material than the rest of the spacer material;
a fluid mover in fluid communication with the insert for moving air through the open space and at least partially past an occupant in the seat;
a tubular structure for providing the fluid communication between the insert and the fluid mover, wherein the tubular structure is provided by a foam cushion and defines a passageway through the cushion; and
a deflector is disposed over the passageway defined by the tubular structure for assisting in directing fluid radially away from the passageway.

11. The ventilated seat of claim 10 wherein a plurality of sub-passageways are formed in the foam cushion and extend radially away from the passageway of the foam cushion.

12. A ventilated seat for a vehicle, comprising:
a vehicle seat having a ventilated component selected from a seat cushion component and a seat backrest component, at least one of which provides a seat cushion and an air-permeable trim surface at occupant contact areas of the seat;
an insert that is open at its sides and located beneath the trim surface of the ventilated component, the insert including:
  i) a first layer having a lay-wire carbon fiber heater integrated therein;
  ii) a second layer formed of spacer material laminated to the first layer with an adhesive, the spacer layer including a pair of fabric panels interconnected by polymeric strand materials for defining an open space between the fabric panels; and
  iii) a buffer layer incorporated into the insert adjacent the first layer, the buffer layer being breathable for allowing fluid flow therethrough.
a fluid mover in fluid communication with the insert for moving air under positive pressure through the open space and at least partially past an occupant in the seat; and
a tubular structure extending through the seat cushion and defining a passageway for providing the fluid communication between the insert and the fluid mover, the tubular structure including an enlarged portion.

13. The ventilated seat of claim 12 wherein the fabric panels of the spacer layer are opposing honeycomb structures that are formed of a finer filament polymeric strand material than the rest of the spacer material.

14. The ventilated seat of claim 12 wherein the tubular structure is integral with the insert.

15. The ventilated seat of claim 12 wherein the tubular structure is defined by a wall and a portion of the wall nearest a forward edge of the seat cushion component is at an angle between about 20 degrees and about 60 degrees relative to another portion of the wail nearest a rearward edge of the seat cushion component.

16. The ventilated seat of claim 12 wherein a deflector is disposed over the passageway defined by the tubular structure for assisting in directing fluid radially away from the passageway.

17. The ventilated seat of claim 16 wherein a plurality of sub-passageways are formed in a foam cushion and extend radially away from the passageway of the foam cushion.

18. The ventilated seat of claim 12 further comprising a control unit for selectively operating the fluid mover, the heater layer or both.

19. The ventilated seat of claim 18 wherein the control unit is configured to operate the heater layer, the fluid mover or both at two or more different output levels.

20. The ventilated seat of claim 19 wherein the fluid mover is configured to push air through the open space of the spacer layer.

21. The ventilated seat of claim 18 wherein the control unit is in signaling communication with a temperature sensor and the control unit is configured to activate the fluid mover if a relatively high temperature is sensed by the sensor and activate the heater if a relatively low temperature is sensed by the sensor.

22. The ventilated seat of claim 18 wherein the fluid mover is configured to pull air through the open space provided by the spacer layer.

23. A ventilated seat for a vehicle, comprising:
a vehicle seat having a pair of ventilated components including a seat cushion component and a seat backrest component, both the seat cushion component and the seat backrest component providing a seat cushion and an air-permeable trim surface at occupant contact areas of the seat;

a pair of inserts, one in the seat cushion component and one in the seat backrest component, each insert being open at its sides and located beneath the trim surface of each ventilated component, each insert including:
  i) a first layer having a lay-wire carbon fiber heater integrated therein;
  ii) a second layer formed of spacer material laminated to the first layer with an adhesive, the spacer layer including a pair of fabric panels interconnected by polymeric strand materials for defining an open space between the fabric panels; and
  iii) a buffer layer incorporated into the insert adjacent the first layer, the buffer layer being breathable for allowing fluid flow therethrough.
a pair of fluid movers respectively in fluid communication with the pair of inserts for moving air through the open space of each insert and at least partially past an occupant in the seat; and
a pair of tubular structures, each structure respectively extending through each seat cushion of each ventilated component and defining a passageway for providing the fluid communication between the respective inserts and the respective fluid movers, each tubular structure including an enlarged portion.

24. A ventilated seat for a vehicle, comprising:
a multi-layer laminate insert that is open at its sides and located beneath the trim surface of the ventilated component, the insert including:
  i) a first layer having a heater integrated therein, the heater including a plurality of flexible electrical substantially flat heating elements;
  ii) a second layer formed of spacer material, the second layer defining an open space, wherein the spacer material provides opposing honeycomb structures that are formed of a finer filament polymeric strand material than the rest of the spacer material;
a blower in fluid communication with the insert for moving air through the open space and at least partially past an occupant in the seat; and
a duct for providing the fluid communication between the insert and the blower.

25. The ventilated seat of claim 24, further comprising a plurality of sub-passageways.

26. The ventilated seat of claim 25 wherein the duct provides a passageway and the plurality of sub-passageways extend radially away from the passageway.

27. The ventilated seat of claim 24 wherein the plurality of heating elements are wires or carbon fibers laminate to a backing.

28. The ventilated seat of claim 24 wherein the spacer material includes polymeric strand material.

29. The ventilated seat of claim 24 wherein the insert further comprises an adhesive layer for adhering the first layer to the second layer.

30. The ventilated seat of claim 24 wherein the duct is provided by a foam cushion and defines a passageway through the cushion.

31. The ventilated seat of claim 30 wherein a deflector is disposed over the passageway defined by the tubular structure for assisting in directing fluid radially away from the passageway.

32. The ventilated seat of claim 31, wherein a plurality of sub-passageways are formed in the foam cushion and extend radially away from the passageway of the foam cushion.

33. The ventilated seat of claim 32 wherein the fluid mover is configured to pull air through the open space provided by the spacer layer.

34. A ventilated seat as in claim 32 wherein the fluid mover is configured to push air through the open space of the spacer layer.

35. The ventilated seat of claim 24, wherein the duct is defined by a wall and a portion of the wall nearest a forward edge of the seat cushion component is at an angle between about 20 degrees and about 60 degrees relative to another portion of the wall nearest a rearward edge of the seat cushion component.

36. The ventilated seat of claim 24 further comprising a control unit for selectively operating the fluid mover, the heater layer.

37. The ventilated seat of claim 36, wherein the control unit is configured to operate the heater layer, the fluid mover or both at two or more different output levels.

38. The ventilated seat of claim 37, wherein the control unit is in signaling communication with a temperature sensor and the control unit is configured to activate the fluid mover if a relatively high temperature is sensed by the sensor and activate the heater if a relatively low temperature is sensed by the sensor.

* * * * *

UNITED STATES PATENT AND TRADEMARK OFFICE
CERTIFICATE OF CORRECTION

PATENT NO. : 6,869,139 B2
DATED : March 22, 2005
INVENTOR(S) : Brennan et al.

It is certified that error appears in the above-identified patent and that said Letters Patent is hereby corrected as shown below:

Title page,
Item [56], References Cited, add the following references:

| | | |
|---|---|---|
| 374,424 | 12/06/1887 | W.Y. Ober |
| 390,154 | 09/25/1888 | G.A. Beach |
| 1,370,832 | 03/08/1921 | B. Mollberg |
| 1,439,681 | 12/26/1922 | L.E. Alkire et al. |
| 1,475,912 | 11/27/1923 | J.R. Williams |
| 1,514,329 | 11/04/1924 | W.N. Metcalf |
| 1,537,460 | 05/12/1925 | J.D. Campbell et al. |
| 1,541,213 | 06/09/1925 | E.P. Harley |
| 1,593,066 | 07/20/1926 | G.H. Gaston |
| 1,664,636 | 04/03/1928 | A. Mayer |
| 1,837,515 | 12/22/1931 | A. Bachrach |
| 1,936,960 | 11/28/1933 | A.H. Bowman |
| 2,022,959 | 12/03/1935 | R.F. Gorsdon |
| 2,103,553 | 12/28/1937 | J.H. Reynolds |
| 2,158,801 | 05/16/1939 | C.J. Petterson |
| 2,336,089 | 12/07/1943 | R.E. Gould |
| 2,493,303 | 01/03/1950 | R.H. McCullough |
| 2,544,506 | 03/06/1951 | S. Kronhaus |
| 2,703,134 | 03/01/1955 | G.L. Mossor |
| 2,749,906 | 06/12/1956 | F.M. O'Connor |
| 2,758,532 | 08/14/1956 | R.H. Awe |
| 2,782,834 | 02/26/1957 | B.R. Vigo |
| 2,791,956 | 05/14/1957 | M.C. Guest |
| 2,826,135 | 03/11/1958 | A. Benzick |
| 2,912,832 | 11/17/1959 | A.R. Clark |
| 2,931,286 | 04/05/1960 | W.L. Fry, Sr., et al. |
| 2,976,700 | 03/28/1961 | W.L. Jackson |
| 2,978,972 | 04/11/1961 | W.F. Hake |
| 2,992,604 | 07/18/1961 | H.H. Trotman et al. |
| 2,992,605 | 07/18/1961 | H.H. Trotman et al. |
| 3,030,145 | 04/17/1962 | O.A. Kotteman |
| 3,101,037 | 08/20/1963 | D.A. Taylor |
| 3,101,660 | 08/27/1963 | D.A. Taylor |
| 3,127,931 | 04/07/1964 | L.H. Johnson |
| 3,131,967 | 05/05/1964 | T.H. Spaulding |
| 3,136,577 | 06/09/1964 | J.D. Richard |
| 3,137,523 | 06/16/1964 | F. Kamer |
| 3,162,489 | 12/22/1964 | H.H. Trotman |
| 3,209,380 | 10/05/1965 | B. Watsky |
| 3,486,177 | 12/30/1969 | I.L. Marshack |
| 3,529,310 | 09/22/1970 | G. Olma |
| 3,550,523 | 12/20/1970 | Segal |
| 3,552,133 | 01/05/1971 | S.M. Lukomsky |

UNITED STATES PATENT AND TRADEMARK OFFICE
CERTIFICATE OF CORRECTION

PATENT NO. : 6,869,139 B2
DATED : March 22, 2005
INVENTOR(S) : Brennan et al.

It is certified that error appears in the above-identified patent and that said Letters Patent is hereby corrected as shown below:

Title page (cont'd),

| | | |
|---|---|---|
| 3,628,829 | 12/21/1971 | Hellig |
| 3,653,589 | 04/04/1972 | McGrath |
| 3,653,590 | 04/04/1972 | Elsea |
| 3,681,797 | 08/08/1972 | Messner |
| 3,684,170 | 08/15/1972 | Roof |
| 3,732,944 | 05/15/1973 | Kendall |
| 3,736,022 | 05/29/1973 | Radke |
| 3,738,702 | 06/12/1973 | Jacobs |
| 3,757,366 | 09/11/1973 | Sacher |
| 3,778,851 | 12/18/1973 | Howorth |
| 3,948,246 | 04/06/1976 | Jenkins |
| 4,002,108 | 01/11/1977 | Drori |
| 4,043,544 | 08/23/1977 | Ismer |
| 4,060,276 | 11/29/1977 | Lindsay |
| 4,065,936 | 01/03/1978 | Fenton et al. |
| 4,072,344 | 02/07/1978 | Li |
| 4,141,585 | 02/27/1979 | Blackman |
| 4,175,297 | 11/27/1979 | Robbins et al. |
| 4,259,896 | 04/07/1981 | Hayashi et al. |
| 4,379,352 | 04/12/1983 | Hauslein et al. |
| 4,391,009 | 07/05/1983 | Schild et al. |
| 4,413,857 | 11/08/1983 | Hayasai |
| 4,509,792 | 04/09/1985 | Wang |
| 4,563,387 | 01/07/1986 | Takagi et al. |
| 4,572,430 | 02/25/1986 | Takagi et al. |
| 4,589,656 | 05/20/1986 | Baldwin |
| 4,665,707 | 05/19/1987 | Hamilton |
| 4,685,727 | 08/11/1987 | Cremer et al. |
| 4,671,567 | 06/09/1987 | Frobose |
| 4,712,832 | 12/15/1987 | Antolini et al. |
| 4,729,598 | 03/08/1988 | Hess |
| 4,777,802 | 10/18/1988 | Feher |
| 4,837,933 | 07/18/1989 | Bedford |
| 4,853,992 | 08/08/1989 | Yu |
| 4,866,800 | 09/19/1989 | Bedford |
| 4,905,475 | 03/06/1990 | Tuomi |
| 4,923,248 | 05/08/1990 | Feher |
| 4,946,220 | 08/07/1990 | Wyon et al. |
| 4,981,324 | 01/01/1991 | Law |
| 4,997,230 | 03/05/1991 | Spitalnick |
| 5,002,336 | 03/26/1991 | Feher |
| 5,004,294 | 04/02/1991 | Lin |
| 5,016,302 | 05/21/1991 | Yu |
| 5,102,189 | 04/07/1992 | Saito et al. |
| 5,106,161 | 04/21/1992 | Meiller |
| 5,117,638 | 06/02/1992 | Feher |

UNITED STATES PATENT AND TRADEMARK OFFICE
CERTIFICATE OF CORRECTION

PATENT NO.     : 6,869,139 B2
DATED          : March 22, 2005
INVENTOR(S)    : Brennan et al.

It is certified that error appears in the above-identified patent and that said Letters Patent is hereby corrected as shown below:

Title page (cont'd),

| | | |
|---|---|---|
| 5,160,517 | 11/03/1992 | Hicks et al. |
| 5,211,697 | 05/18/1993 | Kienlein et al. |
| 5,226,188 | 07/13/1993 | Liou |
| 5,292,577 | 03/08/1994 | Van Kerrebrouck et al. |
| 5,335,381 | 08/09/1994 | Chang |
| 5,354,117 | 10/11/1994 | Danielson et al. |
| 5,356,205 | 10/18/1994 | Calvert et al. |
| 5,370,439 | 12/06/1994 | Lowe et al. |
| 5,372,402 | 12/13/1994 | Kuo |
| 5,382,075 | 01/17/1995 | Shih |
| 5,385,382 | 01/31/1995 | Single, II et al. |
| 5,403,065 | 04/04/1995 | Callerio |
| 5,408,711 | 04/25/1995 | McClelland |
| 5,411,318 | 05/02/1995 | Law |
| 5,416,935 | 05/23/1995 | Nieh |
| 5,524,439 | 06/11/1996 | Gallup etal. |
| 5,561,875 | 10/08/1996 | Graebe |
| 5,590,428 | 01/07/1997 | Rotor |
| 5,597,200 | 01/28/1997 | Gregory et al. |
| 5,613,729 | 03/25/1997 | Summer et al. |
| 5,613,730 | 03/27/1997 | Buie et al. |
| 5,626,021 | 05/06/1997 | Karunasiri et al. |
| 5,626,386 | 05/06/1997 | Lush |
| 5,626,387 | 05/06/1997 | Yeh |
| 5,645,314 | 07/08/1997 | Liou |
| 5,692,952 | 12/02/1997 | Chih-Hung |
| 5,715,695 | 02/10/1998 | Lord |
| 5,787,534 | 08/04/1998 | Hargest et al. |
| 5,833,309 | 11/10/1998 | Schmitz |
| 5,833,321 | 11/10/1998 | Kim et al. |
| 5,918,930 | 07/06/1999 | Kawaiet al. |
| 5,921,314 | 07/13/1999 | Schuller et al. |
| 5,921,858 | 07/13/1999 | Kawai et al. |
| 5,927,817 | 07/27/1999 | Ekman et al. |
| 6,019,420 | 02/01/2000 | Faust et al. |
| 6,048,024 | 04/11/2000 | Wallman |
| 6,059,018 | 05/09/2000 | Yoshinori et al. |
| 6,062,641 | 05/16/2000 | Suzuki et al. |
| 6,068,332 | 05/30/2000 | Faust et al. |
| 6,079,485 | 06/27/2000 | Esaki et al. |
| 6,105,667 | 08/22/2000 | Yoshinori et al. |
| 6,124,577 | 09/26/2000 | Fristedt |
| 6,147,332 | 11/14/2000 | Holmberg et al. |
| 6,278,090 | 08/21/2001 | Frisredt et al. |
| 6,291,803B1 | 09/18/2001 | Fourrey |
| 6,300,150 | 10/09/2001 | Venkatasubramanian |

UNITED STATES PATENT AND TRADEMARK OFFICE
CERTIFICATE OF CORRECTION

PATENT NO.     : 6,869,139 B2
DATED          : March 22, 2005
INVENTOR(S)    : Brennan et al.

It is certified that error appears in the above-identified patent and that said Letters Patent is hereby corrected as shown below:

Title page (cont'd),

| | | |
|---|---|---|
| 6,481,801 | 11/19/2002 | Schmale |
| 6,505,886 B2 | 01/14/2003 | Gielda et al. |
| 6,511,125 | 01/28/2003 | Gendron |
| 6,539,725 B2 | 07/29/2003 | Bell |
| 6,619,736 B2 | 09/16/2003 | Stowe et al. |
| 6,625,990 B2 | 09/30/2003 | Bell |
| 2001/0035669 | 11/01/2001 | Anderson et al. |
| 2002/0017102 | 02/14/2002 | Bell |
| 2002/0092308 | 07/18/2002 | Bell |
| 2002/0105213 A1 | 8/08/2002 | Rauh et al. |
| 2002/0108381 | 08/15/2002 | Bell |
| 2002/0139123 | 10/03/2002 | Bell |
| 2002/0140258 | 10/03/2002 | Ekern et al. |
| 2002/0148236 | 10/17/2002 | Bell |
| 2002/0148345 | 10/17/2002 | Bell |
| 2003/0005706 | 01/09/2003 | Bell |
| 2003/0024924 | 02/06/2003 | Fristedt |
| 2003/0079770 | 05/01/2003 | Bell |
| 2003/0084935 | 05/08/2003 | Bell |
| 2003/0102699 A1 | 06/05/2003 | Aoki et al. |
| 2003/0150229 A1 | 08/14/2003 | Aoki et al. |
| RE38,128 E | 06/03/2003 | Gallup et al. |
| DE 37 05 756 A1 | 10/13/1998 | Metzeler GmbH |
| DE 100 01 314 A1 | 07/19/2001 | Volkswagaon AG |
| DE 100 24 880 C1 | 09/06/2001 | DaimlerChrysler AG |
| DE 197 36 951 A1 | 03/04/1999 | TEXTILFORSCHUNGSINSTITUT |
| DE 199 20 451 A1 | 12/02/1999 | W.E.T. Automotive Systems AG |
| DE 199 54 978 C1 | 01/11/2001 | DaimlerChrysler AG |
| EP 0 517 615 A1 | 12/09/1992 | Allibert S.A. |
| EP 0 936 105 A1 | 08/18/1999 | DaimlerChrysler AG |
| EP 1 075 984 A2 | 02/14/2001 | Volkswagon Aktiengesellschaft |
| EP 1 075 984 B1 | 05/07/2003 | Volkswagon Aktiengesellschaft |
| FR 1,266,925 | 09/07/1960 | M. Frank Karner |
| FR 2 630 056 | 10/20/1989 | Regie National Des Usines Result |
| JP 2002125801 | 02/02/2002 | Hiroshi |
| JP 2003042594 | 02/13/2003 | Hiroshi et al. |
| JP 5277020 | 10/26/1993 | Massato et al. |
| JP 10044756 | 02/17/1998 | Tatsuo |
| WO 02/06914 A1 | 01/24/2002 | Kongberg Automotive AB   --. |

UNITED STATES PATENT AND TRADEMARK OFFICE
CERTIFICATE OF CORRECTION

PATENT NO. : 6,869,139 B2
DATED : March 22, 2005
INVENTOR(S) : Brennan et al.

It is certified that error appears in the above-identified patent and that said Letters Patent is hereby corrected as shown below:

Title page (cont'd),
OTHER PUBLICATIONS, insert:
-- Komfortabel bei jeder Temperatur Excerpt from website http://www.seatcomfort.com/semashow1.htm, Specializing in Seat Ventilation and Heating Systems, Seat Comfort Systems Unveils 3 New Seat Heater Products Excerpt from website http://www.seatcomfort.com/ventilation.htm, Specializing in Seat Ventilation and Heating Systems, Ventilation Excerpt from website http://www.i-car.com/html_pages/about_icar/current_events_news/advantage/advantage 1-Car Advantage Online International Search Report for Application Serial No. PCT/US03/19929 dated October 10, 2003

Copending Application Serial No. 09/755,506 filed January 5, 2001

Copending Application Serial No. 09/755,637 filed January 5, 2001

Copending Application Serial No. 09/755,505 filed January 5, 2001

Copending Application Serial No. 10/434,890 filed May 9, 2003

Copending Application Serial No. 09/619,171 filed July 19, 2000 --.

Signed and Sealed this

Thirtieth Day of August, 2005

JON W. DUDAS
*Director of the United States Patent and Trademark Office*